United States Patent Office 3,121,785
Patented Feb. 18, 1964

3,121,785
FUSION-PRESSURE JOINING OF ALUMINUM ALLOY MEMBERS
James R. Terrill, Natrona Heights, and James C. Richards, Arnold, Pa., assignors to Aluminum Company of America, Pittsburgh, Pa., a corporation of Pennsylvania
No Drawing. Filed Nov. 14, 1961, Ser. No. 152,717
8 Claims. (Cl. 219—118)

This invention relates to the fusion-pressure joining of structural aluminum base alloy members to each other and it is more particularly concerned with the joining of parts of a structure composed of aluminum base alloys by a procedure that involves a slight fusion and the application of pressure forcing the members together. In referring to aluminum base alloys it is to be understood that this means compositions containing alloying elements the total amount of which plus impurities exceeds 2% by weight. Moreover, the term "structural" excludes electrical conductors.

In conventional brazing processes a readily fusible metal is provided between the members to be joined and in the presence of a suitable flux the assembled members and fusible metal are heated to a temperature at which the latter melts and wets the surface of the solid members but very little, if any, fusion of the members occurs. Upon cooling, the liquid metal solidifies and establishes a joint between the members. It has been considered to be necessary to employ a flux to cleanse the surface to be brazed and to wash away any oxide residue. No pressure is applied to the joint other than that which may be needed to maintain the assembly in the desired position during the brazing operation. In this process, the bonding or filler metal must necessarily have a lower melting point than that of the abutting members, and they must retain their integrity to form the desired joint. The solidified bonding metal, of course, remains between the joined members. Also, any flux residue remaining after the brazing operation should be removed in order to avoid any corrosive effect. Since no substantial pressure is applied during the joining operation, there is no intentional plastic flow of the structural members in the region of the joint.

Although joining aluminum base alloy members by the brazing technique yields satisfactory joints for many purposes, yet an intermediate alloy separates the joined members and the strength of the joint is determined by the strength of the filler metal providing it has been properly united with the abutting members. For some purposes, it is desirable to avoid the presence of another alloy at the joint and obtain direct contact between the members. This can be accomplished, for example, by some types of electric welding but that involves expensive equipment and the use of high temperatures. There has been a demand for a joining process which employs much lower temperatures and simple equipment and yet produces a strong metal to metal joint. In addition, the process should provide for bonding over relatively large area instead of in spots such as obtained by the so-called cold welding procedure. The problem of establishing a firm joint between aluminum alloy members is made difficult because of the tenacious oxide film which occurs on the surface of the aluminum alloy. While this film can be removed or displaced by conventional cleaning and fluxing procedures if enough time is allowed, such operations are not acceptable where joints must be formed almost instantaneously and in a limited space.

It is therefore a primary object of this invention to provide a method of joining structural aluminum base alloy members without the use of a saline flux and a filler metal but in which the metal surface is nevertheless cleaned as the joint is formed. Another object is to provide a method of joining such members at temperatures substantially below the melting point of aluminum. A further object is to provide a method of joining structural members of aluminum base alloys in which the members are plastically deformed as the joint is formed. Still another object is to provide a method for making joints between structural aluminum base alloy members by simple and inexpensive means.

It has been found, contrary to expectation, that firm strong joints can be made between aluminum base alloy members without the aid of a flux and at temperatures substantially below the melting point of aluminum by initially providing between the members a small amount of cuprous metal and heating the members assembled in joint relationship, the temperature being raised to at least the point where the copper reacts with the aluminum to produce a molten eutectic. The heating should occur relatively rapidly and the temperature should not go much above the eutectic temperature and thus avoid excessive fusion. Furthermore, all of the copper or copper base alloy at the interface should be consumed before the joint is completed. Either simultaneously with the production of the eutectic or immediately thereafter, pressure should be applied to the joint in sufficient amount to cause expulsion of substantially all of the eutectic from the interface and produce some deformation of the abutting members at their interface. Whatever eutectic or associated phases remains in the joint is too small to have a substantial effect upon the strength of the joint. Upon cooling a firm strong joint is formed between the abutting members. The joining is accomplished with simple and less expensive equipment than in the case of welding. The process is also superior to soldering for no clearance must be maintained between the members to provide space for a filler metal and no flux is needed to prepare the surfaces being joined.

At the temperature where the eutectic is formed the aluminum base alloys become plastic and yield to the pressure applied to the joint thereby permitting some deformation. This is advantageous in some cases, such as where lap joints are produced and some decrease in the thickness of the joint is desired. Not only can lap joints be produced but butt joints as well. The working of the metal resulting from deformation has no deleterious effect upon the joint, and it may be beneficial to the strength of the joint. Since both fusion of the eutectic and pressure are required to form the joint, the process is referred to herein as being a fusion-pressure method.

If the enlargement of the joint resulting from deformation should exceed dimensional limitations, the excess metal can be easily removed by conventional mechanical means.

The eutectic is produced by a reaction of the copper or copper base alloy with the aluminum. In the binary aluminum-copper system the eutectic proportions are 33% by weight of copper and 67% aluminum. Either elemental copper or an alloy containing at least 50% by weight of copper can be used but in the latter case alloys should be chosen in which the elements alloyed with the copper do not adversely affect the formation of the eutectic or the abutting aluminum alloy structural members. Various brasses and bronzes, for example, can be employed to supply the needed elements to react with the aluminum. It will be appreciated that one or more of the elements alloyed with aluminum may enter into the eutectic composition as well as any elements in the copper base alloys. In any event, however, the principal components of the eutectic are aluminum and copper and for that reason the eutectic is referred to herein as being an aluminum-copper eutectic. Also, since copper or copper base alloys are used to react with the aluminum, they are collectively referred to herein as being cuprous metal.

The cuprous metal can be supplied in any convenient form such as thin sheet, foil, powder or even a plated deposit. Thin sheet or foil is preferred because of its ready availability and ease of application. Where a powder or plated deposit is employed, care should be exercised to avoid substances which will interfere with formation of the eutectic or leave an undesirable residue. While some variation in the proportion of cuprous metal to the aluminum base alloy member is permissible, it is essential in any case that enough cuprous metal be provided to form a eutectic over the entire face of the joint. Care should be taken to avoid the presence of unmelted cuprous metal outside the joint since it can give rise to corrosion under unfavorable conditions. By way of example, it has been found that a lap joint can be formed between two aluminum base alloy members ¼ in. in thickness by using copper foil 2 to 6 mils in thickness. For members ⅛ in. in thickness, the foil used should be only 1 to 2 mils in thickness. To produce a butt joint, for example, between aluminum base alloy rods ½ in. in diameter, or plate ¼ to ½ in. in thickness, copper foil 2 to 5 mils in thickness should be employed.

A variety of aluminum base alloys may be used to form the structural members, both those which are hardened solely by cold work and those which undergo a thermal treatment to increase their strength. Representative of the first type are those having a nominal composition, in addition to aluminum, of 1.25% manganese; 1.25% manganese and 1.0% magnesium; 2.5% magnesium and 0.25% chromium; 2.75% magnesium, 0.8% manganese and 0.1% chromium. Alloys of the second type which can be successfully joined by our process are illustrated by the following compositions, exclusive of the aluminum component: 4% copper, 0.5% magnesium and 0.5% manganese; 4.5% copper, 1.5% magnesium and 0.6% manganese; 1% magnesium, 0.6% silicon, 0.25% copper and 0.25% chromium; 5.6% zinc, 2.5% magnesium, 1.6% copper and 0.3% chromium. These alloys and others are given a solution heat treatment, quenched and precipitation hardened, either at room temperature or at a slightly elevated temperature to develop the desired strength and hardness.

When the structural alloy members being joined are in the work hardened or heat treated condition that condition is altered in the area of the joint because of the temperature at which the joint is made. The heating causes the alloy to become partially or totally annealed with a resultant loss in strength, however, the joints can be subsequently cold worked or solution heat treated to restore the strength and hardness, at least to some extent.

The structural members may be in any convenient form such as sheet, rod, bar, plate, wire, extruded or forged shapes. The only limitation is that of thickness of the parts being joined and ability of the apparatus to heat and press the members together.

The surfaces of the portion of the members which will form the joint do not require any protuberances or projections to engage the opposing member and for this reason the surfaces are referred to herein as being smooth. Although a flat surface is preferred a joint can be made between smooth curved surfaces if appropriate tools are employed. Whether the surfaces are flat or curved the pressure should be applied in a direction which will cause expulsion of the molten eutectic from the interface of the abutting members. It is generally desirable to apply pressure in a direction normal to the contacting surfaces. The members being joined need not be of the same cross section or same thickness but it is essential that the joint extend across the abutting face of the smaller of the two members and that substantially all of the eutectic be expelled from the interface. It is to be understood that while our process is especially adapted to joining two members, it can also be used to unite three or more members in a single joint. This can be done particularly well where a lap joint is made.

To form the joint it is essential that the assembled members be quickly heated to the fusion temperature of the aluminum-copper eutectic. Although this can be done with a torch or other heating means, if the cross section of the members is not too large, a very convenient means of heating the members at the joint involves the use of electrically heated carbon blocks. The blocks can be independently heated as resistance elements or a current can be passed through both the blocks and the metal members being joined. In any case the temperature must be raised to the point where fusion of the eutectic occurs, and preferably slightly above that temperature. It will be appreciated that since other elements than copper and aluminum can enter into the eutectic the melting point may be below that of the simple binary aluminum-copper eutectic which melts at 1018° F. The precise melting point is not as important as the fact that fusion must be produced, and this is easily ascertainable by visual examination. The heating should be continued for a long enough period to permit complete dissolution of the solid cuprous metal and avoid a residue or remainder of unmelted metal at the interface between the members. In forming the eutectic some aluminum alloy is necessarily consumed but the amount is very small and in no way weakens the joint. The formation of the eutectic and its expulsion from the interface serves to remove any oxide film on the aluminum alloy surfaces and permits a metal-to-metal contact between the opposing members.

It will be appreciated from the foregoing that a substantial portion of the structural members remain to form the joint and support the load imposed on the structure. If the eutectic consumes a substantial portion of the members or completely dissolves them no permanent joint is produced which can withstand loading. It is therefore apparent that the structural members must have adequate thickness, at least more than the thickness of commercially produced foil. As a practical matter our process finds its greatest utility where at least 50% of the member remains unaffected by the formation of the eutectic.

Either simultaneously with the heating or immediately thereafter sufficient pressure is applied to the joint to squeeze out the molten eutectic. Generally the pressure should be at least 200 p.s.i. and preferably at least 1000 p.s.i. The maximum pressure which should be used is determined by the degree of deformation of the members which can be tolerated. Since the aluminum base alloy is relatively soft at the eutectic temperature, the pressure needed to expel the eutectic and deform the metal is not great. A pressure in excess of 5000 p.s.i. is not ordinarily required to produce a satisfactory joint. The pressure should be great enough, in any case, to expel substantially all of the eutectic, the amount which remains being too small to have any significant effect upon the strength of the joint.

No flux is required to remove impurities and oxide film from the surfaces of the structural members before the joint is effected nor is it necessary to perform the joining operation under a protective atmosphere. It is advisable, however, to wipe off any dirt or other loosely held contaminant.

The invention is illustrated by the following examples where either copper or brass foil was used in making lap and butt joints between aluminum base alloy structural members which were in the form of sheet and plate.

In making the lap joints, strips of sheet of three different alloys were employed, the nominal composition of which were (A) aluminum and 1.25% manganese; (B) aluminum, 2.5% magnesium and 0.25% chromium; and (C) aluminum, 1.0% magnesium, 0.6% silicon, 0.25% copper and 0.25% chromium. Alloy A strip was 0.064 in. in thickness and was in the cold rolled condition, having received a reduction in cross section of 40% after the last annealing operation. Alloy B strip was 0.125 in. in thickness and had received approximately a 20% reduction in thickness by cold rolling after it had been annealed. Alloy C strip, also 0.125 in. in thickness, had received a conventional solution heat treatment at 970° F. followed by a precipitation hardening treatment at 320° F. The strips, 0.25 to 0.375 in. in width, were overlapped 0.5 in. with copper or brass foil inserted between the strips. The copper foil used between Alloy A strips was 1.5 mils in thickness while that placed between the Alloy B strips was 2 mils in thickness. The 70–30 brass foil positioned between the Alloy C strips was 1 mil in thickness. The lap joints were produced by heating the assembled members and foil inserts in carbon block brazing apparatus using an A.C. current of 500 to 600 amperes under a potential of 7 to 9 volts. A pressure of 1200 to 2000 p.s.i. was applied during a heating period of 7 to 25 seconds. At the end of the heating period, the joined members were removed from the apparatus and cooled to room temperature. The joined strips were subjected to a tensile test to determine the strength of the joints. The results of these tests are given below in Table I along with the typical tensile strength values for the respective alloys in the annealed condition.

TABLE I

*Strength of Lap Joints*

| Alloy | Foil Insert | Tensile Strength, p.s.i. | Typical Tensile Strength of Annealed Alloy, p.s.i. |
|---|---|---|---|
| A | Copper | 16,100 | 16,000 |
| B | Copper | 23,900 | 28,000 |
| C | Brass | 21,000 | 18,000 |

At the edge of the lap joint there was a bead of eutectic, but there was no evidence of the eutectic at the interface where the members had separated. It is significant that the strength of the lap joints was close to that of the annealed alloys, thus indicating that a relatively high strength had been obtained by our new joining process.

In another test a butt joint was made between the ends of two bars of plates of Alloy A 0.25 in. in thickness and 0.5 in. in width, with a copper foil insert 5 mils in thickness at the interface. The plates were in the cold rolled condition as a result of rolling with a 40% reduction in thickness from that of the plate in the annealed condition. The bars were placed in a horizontal press having upper and lower jaws or holders for gripping the bars to be joined. The lower jaws were of steel while the upper ones were composed of an aluminum alloy and had internal water cooling passages therein. The upper jaws were connected to a source of A.C. current. A current of 500 to 600 amperes at a potential of 7 to 9 volts was passed through the abutting bars and copper insert pressed together under a load of 1400 p.s.i. for a period of 60 seconds. A longer heating period was required than with the carbon block apparatus used in making the lap joints in the preceding examples because of the lower resistance in the heating system. At the conclusion of the heating period the joined bars were removed from the press and cooled to room temperature after which they were subjected to a tensile test. The average strength of the butt joints was found to be 12,800 p.s.i. There was no evidence of the aluminum-copper eutectic at the interface where the joint broke in tension, it having been expelled from the interface.

Having thus described our invention and certain embodiments thereof, we claim:

1. The method of fusion-pressure joining structural members of aluminum base alloys containing at least 2% by weight of added elements and impurities comprising providing a smooth surface on the members at the interface where they are to be joined, providing a relatively small amount of cuprous metal at the interface, assembling the members in joint relationship, rapidly heating the joint to a temperature at least high enough to produce a molten eutectic containing aluminum and copper as the principal components, said molten eutectic extending over the entire interface of at least one of the members being joined but leaving a substantial portion of the members in the solid state, applying at least sufficient pressure to the joint to expel substantially all of the liquid eutectic from the interface of the joint and deform the members at the interface, and thereafter cooling the joint.

2. The method according to claim 1 wherein the cuprous metal consists of copper.

3. The method according to claim 1 wherein the cuprous metal is in the form of foil.

4. The method according to claim 1 wherein the pressure applied to the joint is between 100 and 5000 p.s.i.

5. The method according to claim 1 wherein the members to be joined have flat smooth surfaces at their interface.

6. The method of fusion-pressure joining structural members of aluminum base alloys containing at least 2% by weight of added elements and impurities comprising providing a flat smooth surface on the members at the interface where they are to be joined, positioning a thin sheet of cuprous metal between the members where the joint is to be made, rapidly heating said assembled joint between electrically heated carbon blocks to a temperature at least high enough to produce a molten eutectic containing aluminum and copper as the principal components, said molten eutectic extending over the entire interface of at least one of the members being joined but leaving a substantial portion of the members in the solid state, simultaneously applying at least sufficient pressure to said blocks to expel substantially all of the liquid eutectic from the interface of the joint and deform the members at the interface, and thereafter removing the joined members from the said heating device and cooling them.

7. The method according to claim 6 wherein the cuprous metal is copper.

8. The method of fusion-pressure joining structural members of aluminum base alloys containing at least 2% by weight of added elements and impurities, said members being in the solution heat treated, quenched and precipitation hardened condition, said method comprising providing a smooth surface on the members at the interface where they are to be joined, providing a relatively small amount of cuprous metal at the interface, assembling the members in joint relationship, rapidly heating the joint to a temperature at least high enough to produce a molten eutecic containing aluminum and copper as the principal components, said molten eutectic extending over the entire surface of at least one of the members being joined but leaving a substantial portion of the members in the solid state, applying at least sufficient pressure to the joint to expel substantially all of the liquid eutectic from the interface of the joint and deform the members at the interface, cooling the joint and thereafter subjecting it to solution heat treatment, quenching and precipitation hardening.

References Cited in the file of this patent

UNITED STATES PATENTS 2,790,656   Cook _____ Apr. 30, 1957

FOREIGN PATENTS 813,357   France _____ Feb. 22, 1937